M. K. HOPKINS.
FUSIBLE LINK.
APPLICATION FILED MAY 6, 1918.

1,405,512.

Patented Feb. 7, 1922.

Witnesses:
W. F. Kilroy
Harry R. L. White.

Inventor
Morton K. Hopkins
By Hill & Hill
Attys.

M. K. HOPKINS.
FUSIBLE LINK.
APPLICATION FILED MAY 6, 1918.
1,405,512.
Patented Feb. 7, 1922.
3 SHEETS—SHEET 2.
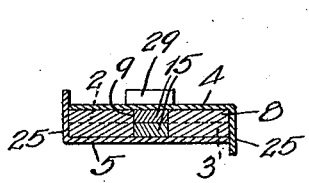
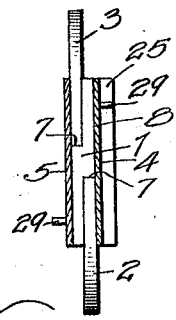
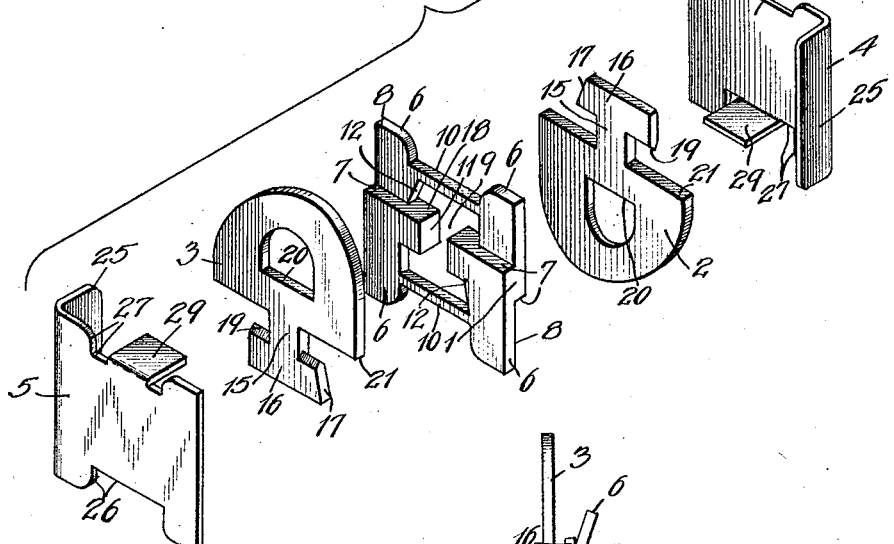
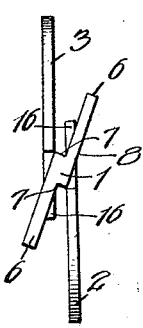
Witnesses:
W. F. Kilroy
Harry R. L. White
Inventor:
Morton K. Hopkins
By Hill & Hill
Attys.

M. K. HOPKINS.
FUSIBLE LINK.
APPLICATION FILED MAY 6, 1918.
1,405,512.
Patented Feb. 7, 1922.
3 SHEETS—SHEET 3.
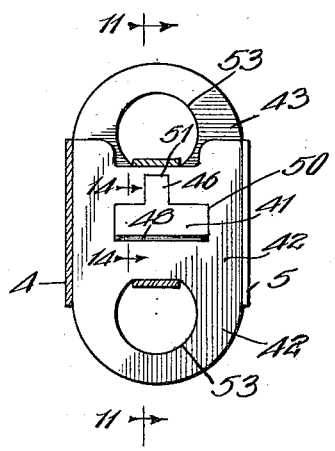
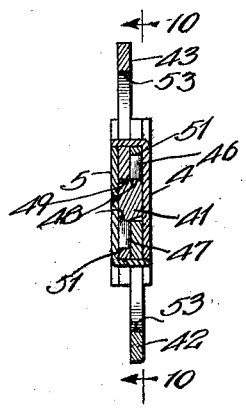
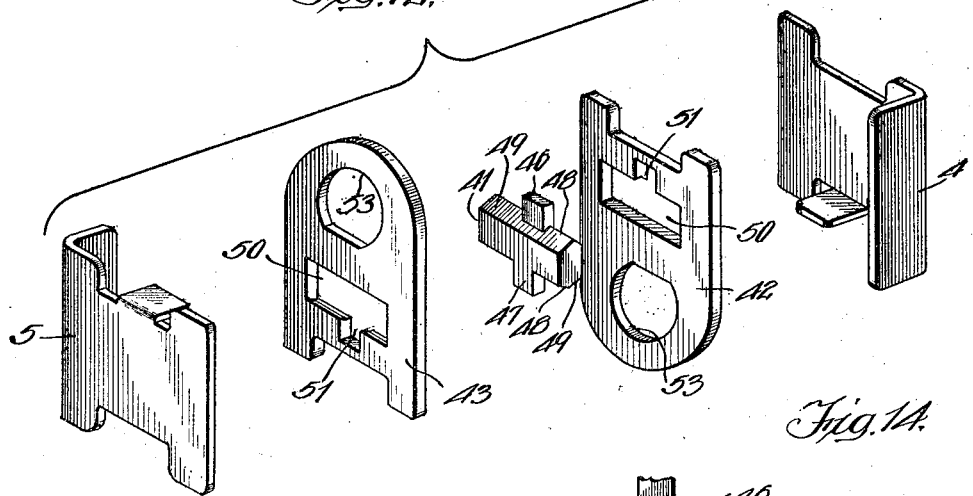
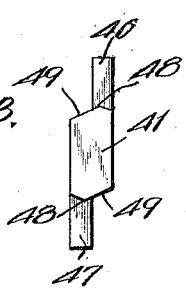
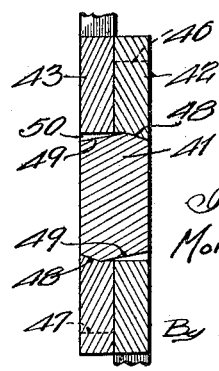
Witnesses:
W. F. Kilroy
Harry R. L. White
Inventor:
Morton K. Hopkins
By Hill & Hill
Attys.

UNITED STATES PATENT OFFICE.

MORTON K. HOPKINS, OF CHICAGO, ILLINOIS, ASSIGNOR TO JOHN L. KENNEDY, OF CHICAGO, ILLINOIS.

FUSIBLE LINK.

1,405,512.  Specification of Letters Patent.  Patented Feb. 7, 1922.

Application filed May 6, 1918. Serial No. 232,911.

*To all whom it may concern:*

Be it known that I, MORTON K. HOPKINS, a citizen of the United States, residing at Chicago, in the county of Cook and State of Illinois, have invented certain new and useful Improvements in Fusible Links, of which the following is a description.

My invention belongs to that general class of devices known as fusible links, which under normal conditions will securely connect cooperating parts or mechanism, but under abnormal conditions release the same. Devices of this kind are used for many purposes, but are particularly desirable and generally used for automatic sprinkler heads and my improved link is especially adapted for that use, but obviously may be used wherever found desirable. The invention has among its objects the production of a device of the kind described that is simple, convenient, durable, compact, efficient and satisfactory. It has particularly as an object the production of a device that will be extremely strong and efficient under normal conditions, but which under abnormal conditions will quickly, satisfactorily and reliably release. It also has as an object the production of a device that may be substantially entirely enclosed so that it will not be apt to corrode, or for any other reason be rendered inoperative in an emergency. Many other objects and advantages of the construction herein shown and described will be obvious to those skilled in the art from the disclosures herein given.

To this end, my invention consists in the novel construction, arrangement and combination of parts herein shown and described and more particularly pointed out in the claims.

In the drawings, wherein like reference characters indicate like or corresponding parts, Fig. 1 is a side elevation of one form of my device;

Fig. 6 is a sectional view taken substantially on line 6—6 of Fig. 2;

Fig. 7 is a sectional view taken substantially on line 7—7 of Fig. 3;

Fig. 8 is a perspective view of the parts disassembled, showing their relative positions;

Fig. 9 is a side elevation with the guards removed, showing the device while the parts are releasing;

Fig. 10 is a sectional view taken substantially on line 10—10 of Fig. 11, illustrating another form of my device;

Fig. 11 is a sectional view taken substantially on line 11—11 of Fig. 10;

Fig. 12 is a perspective view of the parts disassembled, showing their relative positions;

Fig. 13 is a side elevation of toggle member 41; and

Fig. 14 is a sectional view taken substantially on line 14—14 of Fig. 10.

Figure 1:
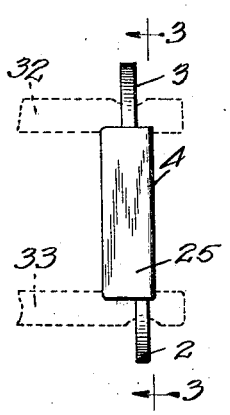

Referring to the drawings, the link consists of a key member or part 1 and a pair of cooperating plate members 2 and 3, and if desired cover plates 4 and 5. Members 2 and 3 are preferably similar as are also cover parts 4 and 5, the description of one of each of the pairs will therefore suffice for both. It may be mentioned that the parts hereafter described may be made of suitable material and of the desired size and shape, this ordinarily depending upon the particular use to which the link is to be put.

Part 1 consists of a divided central body portion having end portions 6—6, which are joined to the central portion at each side, there being an offset or shoulder 7—7 at opposite sides, the offset being preferably equal to the thickness of the end portions 6 so that the face portion 8 at one end is substantially in alignment with the face portion 8 at the opposite end on the opposite side. The body or central portion is preferably cut away as at 9, leaving extending parts 11 constituting key engaging means, the two side portions being connected by the cross parts 10—10, the opening in the construction shown substantially a double T-shaped opening, or opening the shape of an H. I have shown one end of each opening at an angle as at 12, the purpose of this being more fully explained hereafter.

Figure 3:
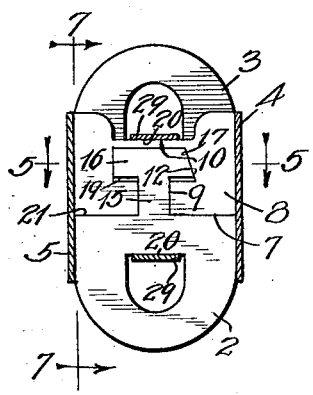
Fig. 3 is a sectional view substantially on line 3—3 of Fig. 1.

Each of the parts or plates 2 and 3 consist of a body formed with a substantially T-shaped slot in the walls thereof engaging part 15—16, the plate being in the preferred construction of a thickness equal to the offset or the thickness of the end parts 6 of the body 1. The part 15 is preferably of a size to fit the opening 9. The extending part 16 is of a size to fit the opening between the parts 6—6, bar 10 and central extending parts 11. The same is also cut as at 17 where it is to be used on a key plate formed as at 12. The under face 19 at each side of the key engaging means or part 16 is arranged to bear against and engage the surface 18 on parts 11, and the edge 21 with the shoulder 7 on the other side of the parts 11. I generally prefer to form the edge at 19 so that substantially a knife edge is formed. I have shown the same at about the center, it being understood that it may be varied as desired. The opposite end of part 2 may be formed as desired, the same preferably having an opening 20 therein. The parts 2 and 3 are assembled substantially as shown in Figs. 3 and 7 so that the ends 2 and 3 project beyond the bars 10 at each end of the body 1, but on opposite sides thereof, the thickness of the three parts being equal to the thickness of the central portion of the body part 1 (see Fig. 7).

Figure 2:
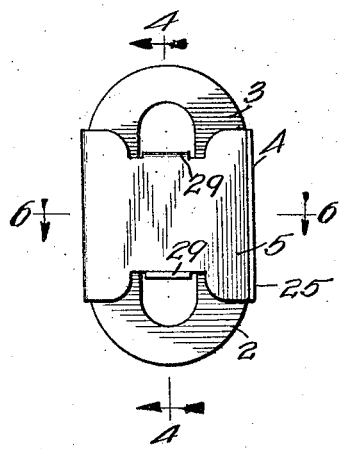
Fig. 2 is a front view of the same.

Each cover plate consists of a body portion 24 having the flange 25, one end being cut as at 26 and the other as at 27, so as to substantially conform to the contour of the body part 1, as is most clearly shown in Fig. 2. At one end is provided a prong or extending part 29.

Figure 4:
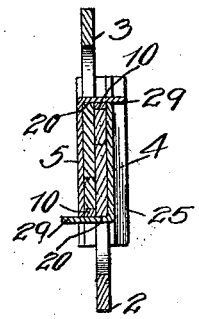
Fig. 4 is a sectional view taken substantially on line 4—4 of Fig. 2.
Figure 5:
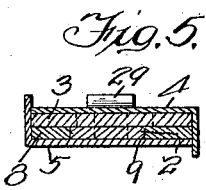
Fig. 5 is a sectional view taken substantially on line 5—5 of Fig. 3.

When the parts 1, 2 and 3 are assembled together (see Figs. 2 and 4), cover plates 4 and 5 may be arranged as shown with the prongs or parts 29 at the end extending through the opening 20 and engaging the bar 10 with the flanges 25 at each side. The assembled parts 1, 2 and 3 are detachably secured together by means of suitable solder or the equivalent, so that when a certain amount of heat reaches the link parts they will be easily separated or release. The cover plates 4 and 5 arranged on the link portions are also soldered about the edges by suitable solder of the desired melting point, the same serving as a cover or seal so that dirt and moisture is kept from the parts of the links and corrosion prevented. I have shown in Fig. 1 members 32 and 33, the same representing any cooperating mechanism to be secured together by the link. When heat is applied to the link, it being understood that ordinarily pressure is as indicated by the arrows shown in Fig. 1, the solder is fused and the strain on the ends of parts 2 and 3 throws the parts (the cover plates not shown) substantially into the positions shown in Fig. 9, causing them to release. By making the openings and bars 16 as shown, or in an equivalent manner, it is necessary to assemble the parts in a predetermined manner should that be desired. It will be noted that when the parts are secured together substantially as shown in Fig. 7 and strain applied on the parts 2 and 3, there may be a considerable pull on the parts upon each other with no possible chance for springing. In fact, the strength of the link is practically equal to the strength of the material. When, however, the solder is fused or melted, the parts tend to quickly and positively release.

In the form of the device shown in Figs. 10 to 14, 41 represents the key member, and 42 and 43 the cooperating members or plates, and 4 and 5 the cover plates similar to those previously described. In this case the key member 41 consists of the body part having tongues or extending parts 46 and 47, the same being offset as most clearly shown in Fig. 13. The key member is formed with bearing shoulders 48 at opposite sides at each side of the extending parts 46 and 47. These shoulders may be and are preferably brought substantially to an edge, or so that the bearing area or face is reduced, so that the device will operate freely. I have also shown the same slightly cut away at 49 (Fig. 14), so as to provide a clearance when the same rock, that is to say when the link releases the cooperating parts held thereby. Each cooperating member or plate 42 and 43 is provided with an opening or perforation 50 of a size to receive half of the body part 41, and with a cut out portion of a size to receive the extensions 46 and 47 when the link is assembled as shown in Figs. 10 and 11. These openings are substantially T-shaped in the preferred construction shown. The part at each side of the cut out portion 51 constitutes the means for engaging the key member. It will be noted by referring to Fig. 10 that the key member and opening 50 are preferably so proportioned that the key member 41 must be assembled with its cooperating plates in a predetermined manner. This may be accomplished by making one end of 41 slightly longer than the opposite side, or in an equivalent manner. Referring to Fig. 14, it will be noted that the key member engaging edge at the opening 50 at each side of the cut out 51 is preferably formed as at 52, so that when the parts are secured together there is no tendency for transverse movement of the parts, the slight level or inclination tending to oppose any transverse movement of the parts other than the rocking action. It may be mentioned that the particular distance of the line or edge 48 from the center of the body 41 may be as desired, but ordinarily it is nearer the center than the outer edge. Where the same is in the center, however, it will be obvious that in this case it is not necessary to assemble the parts together in a predetermined manner as that will be immaterial. Where, however, they are nearer one side or the other and it is desired to always assemble them in one way, then it is desirable to construct the parts as previously described so that they can be assembled only in the intended manner. The parts 42—43 have openings 53 for engagement with suitable cooperating mechanism to be retained.

The parts are assembled as shown in Figs. 10, 14 and 11, with the two cooperating plates or members 42—43 face to face with an end of each extending beyond the end of the other, with the member 41 entirely confined within the confines of the plates. The parts may be then secured together with solder or fusible material, or its equivalent, which will release at a desired temperature, after which the cover plates 4 and 5 are placed and the same sealed all about the edges or points, so that the main part of the link, with the exception of the two ends having the openings 53, is entirely enclosed or confined. The rocking action is obvious, for as soon as the retaining solder or its equivalent releases, strain on the parts tends to cause the key member to throw the parts sideways and release. It will be particularly noted that there is nothing that would catch and cause the device to partially lock or prevent its entirely releasing.

Having thus described my invention, it is obvious that various immaterial modifications may be made in the same without departing from the spirit of my invention, hence I do not wish to be understood as limiting myself to the exact form, construction, arrangement and combination of parts herein shown and described or uses mentioned.

What I claim as new and desire to secure by Letters Patent is:—

1. A fusible link comprising duplicate members formed to lie one upon the other with the free ends extending in opposite directions, each provided with a key-engaging recess in combination with a cooperating key member therefor formed with offset parts on opposite sides thereof cooperating with the first named members, said key member being formed to operatively engage the key-engaging recesses of the duplicate members with the offset parts of the key member at opposite sides thereof lying one on each side of the device substantially in the plane of the corresponding duplicate member, substantially as described.

2. A fusible link comprising duplicate members formed to lie one upon the other with the free ends extending in opposite directions, each provided with key-engaging means, in combination with a cooperating key member therefor formed with offset parts on opposite sides thereof, cooperating with the duplicate members, said key member being formed to engage the engaging means of the duplicate members with the offset parts of the key member at opposite sides thereof lying one on each face of the device substantially in the plane of the corresponding duplicate member, and cover plates arranged to cover the two faces of the device, substantially as described.

3. A fusible link comprising duplicate members formed to lie one upon the other with the free ends extending in opposite directions, each of said members having a T-shaped opening formed near the inner end thereof with the stem of the T extending away from the free end of the duplicate member, in combination with a key member therefor provided with a central body adapted to be positioned in the registering T-shaped openings in the duplicate members with extending offset parts thereon, each arranged to be positioned in the stem of the opening in one only of the duplicate members, substantially as described.

4. A fusible link comprising duplicate members formed to lie one upon the other with the free ends extending in opposite directions, each of said members having a T-shaped opening formed near the inner end thereof with the stem of the T extending away from the free end of the duplicate member, in combination with a key member therefor provided with a central body adapted to be positioned in the registering T-shaped openings in the duplicate members with extending offset parts thereon, each arranged to be positioned in the stem of the opening in one only of the duplicate members, and cover plates formed to enclose the faces and edges of the link parts, substantially as described.

5. A fusible link comprising duplicate members formed to lie one upon the other with the free ends extending in opposite directions, each provided with key engaging means, in combination with a cooperating substantially cross-shaped key member therefor formed with offset parts on opposite sides thereof cooperating with the duplicate members, with the key member arranged to engage the duplicate members with an offset part of said key member on each side of the device in substantially the same plane as the face of its corresponding duplicate member, the line of contact of the edge faces of the key member and the duplicate members being reduced to accelerate the disengagement of the parts, substantially as described.

6. A fusible link comprising duplicate members formed to lie one upon the other with the free ends extending in opposite directions, each having substantially parallel flat faces and each provided with key-engaging means, in combination with a key member arranged to operatively engage said key-engaging means, and cover plates for the opposite faces of the device, each having one side bent at substantially a right angle to cover one edge of the device and a transversely bent tongue to lie within the end opening of one of the duplicate members, whereby upon bringing the parts together as described with fusible retaining means they will form a unitary device with two substantially parallel flat faces.

7. A fusible link comprising duplicate members with the free ends thereof disposed in opposite directions, each member being provided with key engaging means in combination with a key member having offset portions on opposite sides thereof cooperating with the key engaging means of the link members, each offset part of the key member lying within the plane of the face of its corresponding link member, and a cover plate for a portion of the link members and the key member, substantially as described.

In testimony whereof, I have hereunto signed my name in the presence of two subscribing witnesses.

MORTON K. HOPKINS.

Witnesses:
 JOHN W. HILL,
 CHARLES I. COBB.